United States Patent
Lee et al.

[11] Patent Number: 5,841,754
[45] Date of Patent: Nov. 24, 1998

[54] OPTICAL PICKUP DEVICE HAVING AN OBJECTIVE LENS AND AUXILIARY LENSES EXTERIOR THEREOF

[75] Inventors: Chul-woo Lee; Jang-hoon Yoo, both of Seoul, Rep. of Korea

[73] Assignee: Samsung Electronics Co., Ltd., Seoul, Rep. of Korea

[21] Appl. No.: 772,362

[22] Filed: Dec. 23, 1996

[30] Foreign Application Priority Data

Dec. 22, 1995 [KR] Rep. of Korea ................. 1995-54738

[51] Int. Cl.⁶ .............................................. G11B 7/00
[52] U.S. Cl. ............................... 369/109; 369/112
[58] Field of Search ................................. 369/112, 103, 369/109, 44.23, 44.32, 44.37, 117, 118

[56] References Cited

U.S. PATENT DOCUMENTS

| | | | |
|---|---|---|---|
| 4,460,990 | 7/1984 | Opheij | 369/112 |
| 4,969,142 | 11/1990 | Nagashima et al. | 369/109 |
| 5,198,916 | 3/1993 | Kim | 359/15 |
| 5,216,649 | 6/1993 | Koike et al. | 369/112 |

FOREIGN PATENT DOCUMENTS

| | | |
|---|---|---|
| 0 190 698 A | 8/1986 | European Pat. Off. |
| 0 351 953 A | 1/1990 | European Pat. Off. |
| 62 289749 A | 12/1987 | Japan . |
| 04 228124 A | 8/1992 | Japan . |
| 8-24968 | 3/1996 | Japan . |

OTHER PUBLICATIONS

Research Disclosure, No. 321, Jan. 1, 1991, p. 49 XP000163476 "Reduction Of Optical Disk Noise By Collection Of Scattered Light".

Primary Examiner—Tan Dinh
Attorney, Agent, or Firm—Staas & Halsey

[57] ABSTRACT

An optical pickup device which can obtain a stable reproduction signal by an increased numerical aperture of an objective lens. The optical pickup device includes an objective lens unit having an objective lens facing a disc and having a predetermined effective diameter and at least two auxiliary lenses provided in exterior sides of the objective lens for directing +1st-order diffracted light to a light path different from that of the light passing through the objective lens, a light source for irradiating light onto the disc through the objective lens, a light splitter interposed between the light source and the objective lens for directing the light reflected from the disc to a light path different from that from the light source, a photodetector for detecting the light reflected from the disc and transmitted via the light splitter, and at least two diffracted light detectors for detecting diffracted light incident from the auxiliary lenses. Therefore, a high reproduction signal and a stable track signal can be obtained.

52 Claims, 8 Drawing Sheets

OPTICAL PICKUP DEVICE HAVING AN OBJECTIVE LENS AND AUXILIARY LENSES EXTERIOR THEREOF

BACKGROUND OF THE INVENTION

1. Field of the Invention

The present invention relates to an optical pickup device, and more particularly, to an optical pickup device which can obtain a stable reproduction signal by an increased numerical aperture of an objective lens.

An optical pickup records and reproduces information such as video or audio data onto/from optical recording media, e.g., discs (or disks). A disc has a structure where a recorded surface is formed on a substrate. For example, the substrate can be made of plastic or glass. In order to read or write information from a high-density disc, the diameter of the optical spot must be very small. To this end, the numerical aperture (NA) of an objective lens is generally made large, and a light source having a shorter wavelength is used. However, in the case of using the shorter wavelength light source, a tilt allowance of the disc with respect to the optical axis of the objective lens is reduced. The thus-reduced disc tilt allowance can be increased by reducing the thickness of the disc.

Assuming that the tilt angle of the disc is θ, the magnitude of a coma aberration coefficient $W_{31}$ can be obtained from:

$$W_{31} = -\frac{d}{2}\left(\frac{n^2(n^2-1)\sin\theta\cos\theta}{(n^2-\sin^2\theta)^{\frac{5}{2}}}\right)NA^3$$

where d and n represent the thickness and refractive index of the disc, respectively. As understood from the above relationship, the coma aberration coefficient is proportional to the cube of the numerical aperture. Therefore, considering that the numerical aperture of the objective lens required for a conventional compact disc (CD) is 0.45 and that for a conventional digital video disc or digital versatile disc (DVD) is 0.6, the DVD has a coma aberration coefficient of about 2.34 times that of the CD having the same thickness for a given tilt angle. Thus, the maximum tilt allowance of the DVD is therefore controlled to be reduced to about half that of the conventional CD. In order to conform the maximum tilt allowance of the DVD to that of the CD, the thickness d of the DVD could be reduced.

From a standpoint of users, it is very important to equip a high-density disc with compatibility with a conventional disc. However, the change in the disc thickness due to the high density results in a corresponding spherical aberration. If the spherical aberration is extremely increased, the spot formed on the disc cannot have the light intensity needed for recording information, which prevents the information from being recorded precisely. Also, during reproduction of the information, the signal-to-noise (S/N) ratio is too low to reproduce the recorded information exactly.

Finally, a compatible pickup which can read discs having different thicknesses, such as a CD or a DVD, becomes necessary.

2. Description of the Related Art

A conventional compatible pickup utilizes a hologram lens (as in Japanese Patent Laid-open Publication No. hei 7-98431), adopts two objective lenses, or adopts a physical aperture diaphragm (as in U.S. Pat. No. 5,281,797). However, because such conventional compatible pickups require additional components, the manufacturing cost is increased accordingly.

Also, a high-density disc such as the DVD has a track pitch and pit much smaller than those of the conventional CD. Further, since the degree of modulation of the DVD is reduced by more than 35% as compared to that of the CD, it is difficult to obtain a stable track signal. Particularly, in the case of the DVD, if an incident light beam deviates from the center with respect to the objective lens during reproduction of information, i.e., if a beam shift occurs, an optical modulation function cannot exceed a diffraction limit curve.

SUMMARY OF THE INVENTION

It is an object of the present invention to provide an improved optical pickup which can obtain a stable reproduction signal and servo signal by detecting ±1st-order diffracted light which is reflected from a disc as a track compensation signal, and which can adopt both an objective lens having light blocking means and a conventional objective lens.

To accomplish the above and other objects, there is provided an optical pickup device according to the present invention, comprising an objective lens unit having an objective lens facing a disc and having a predetermined effective diameter and at least two auxiliary lenses provided in exterior ends of the objective lens for directing ±1st-order diffracted light in a path different from that of the light passing through the objective lens; a light source for radiating light onto a disc through the objective lens; a beam splitter interposed between the light source and the objective lens for directing the light reflected from the disc into a path different from that of the light from the light source; a light detector for detecting the light reflected from the disc and traveling through the beam splitter; and at least two diffracted light detectors for detecting the diffracted light incident from the auxiliary lenses.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

Figure 1:
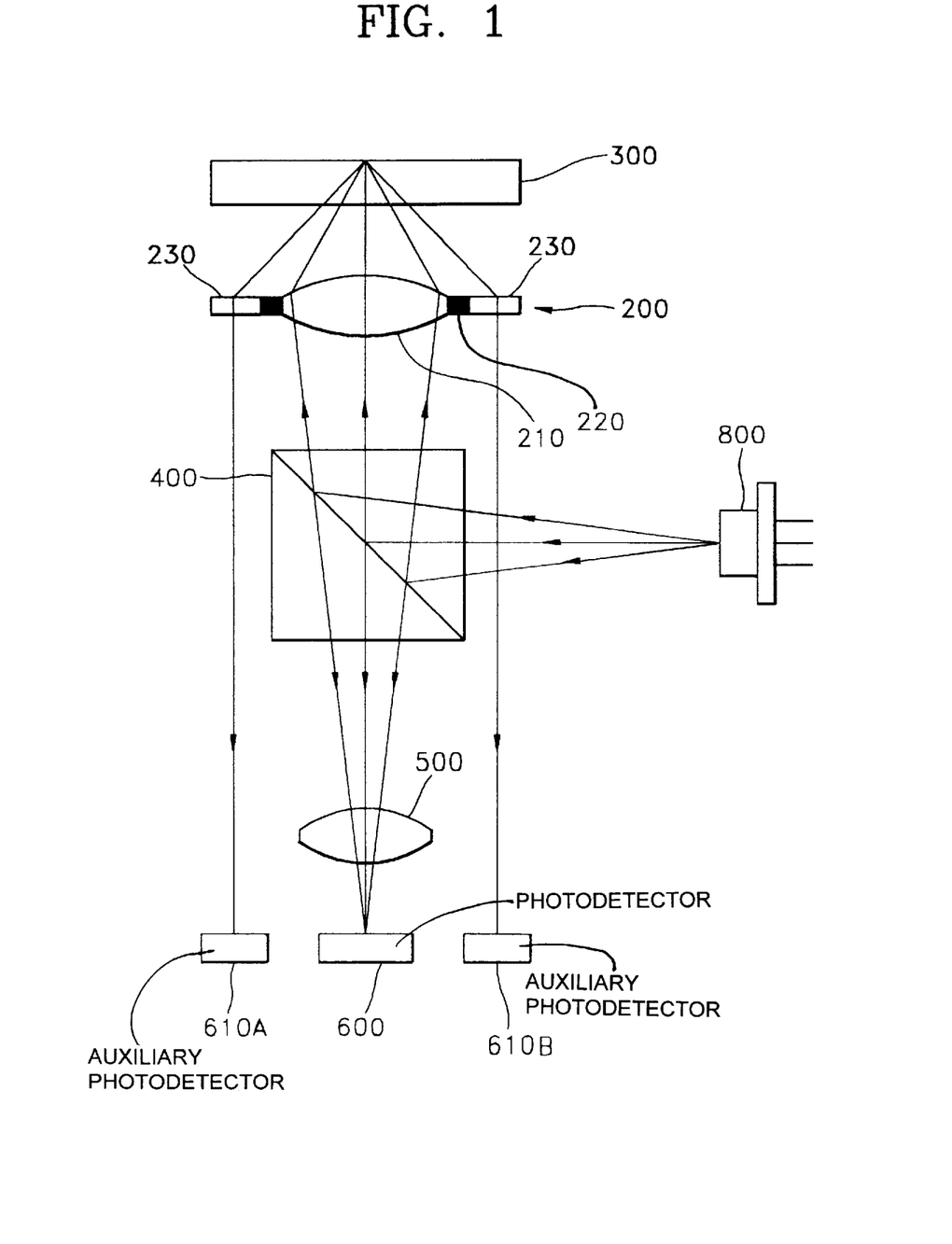
FIG. 1 is a schematic diagram of an optical pickup device according to a first embodiment of the present invention.

Referring to FIG. 1, an objective lens unit 200 facing a disc 300 has an objective lens 210 with light controlling means 220 in its periphery, and an auxiliary lens unit (auxiliary lenses 230) positioned in the outer area of the light controlling means 220. A photodetector 600 for detecting the light passing through the objective lens 210 is positioned in the light path of the objective lens 210. A beam splitter 400 and a detecting lens 500 are in turn positioned between the objective lens unit 200 and the photodetector 600. A light source 800, such as a laser diode, is positioned in the path diffracted by the beam splitter 400. Auxiliary photodetectors 610A and 610B for detecting the light from the auxiliary lenses 230 are provided in exterior sides of the photodetector 600. In such a configuration, a hologram lens based on a diffraction theory as well as a general refractive lens may be adopted as the auxiliary lens.

Figure 2:
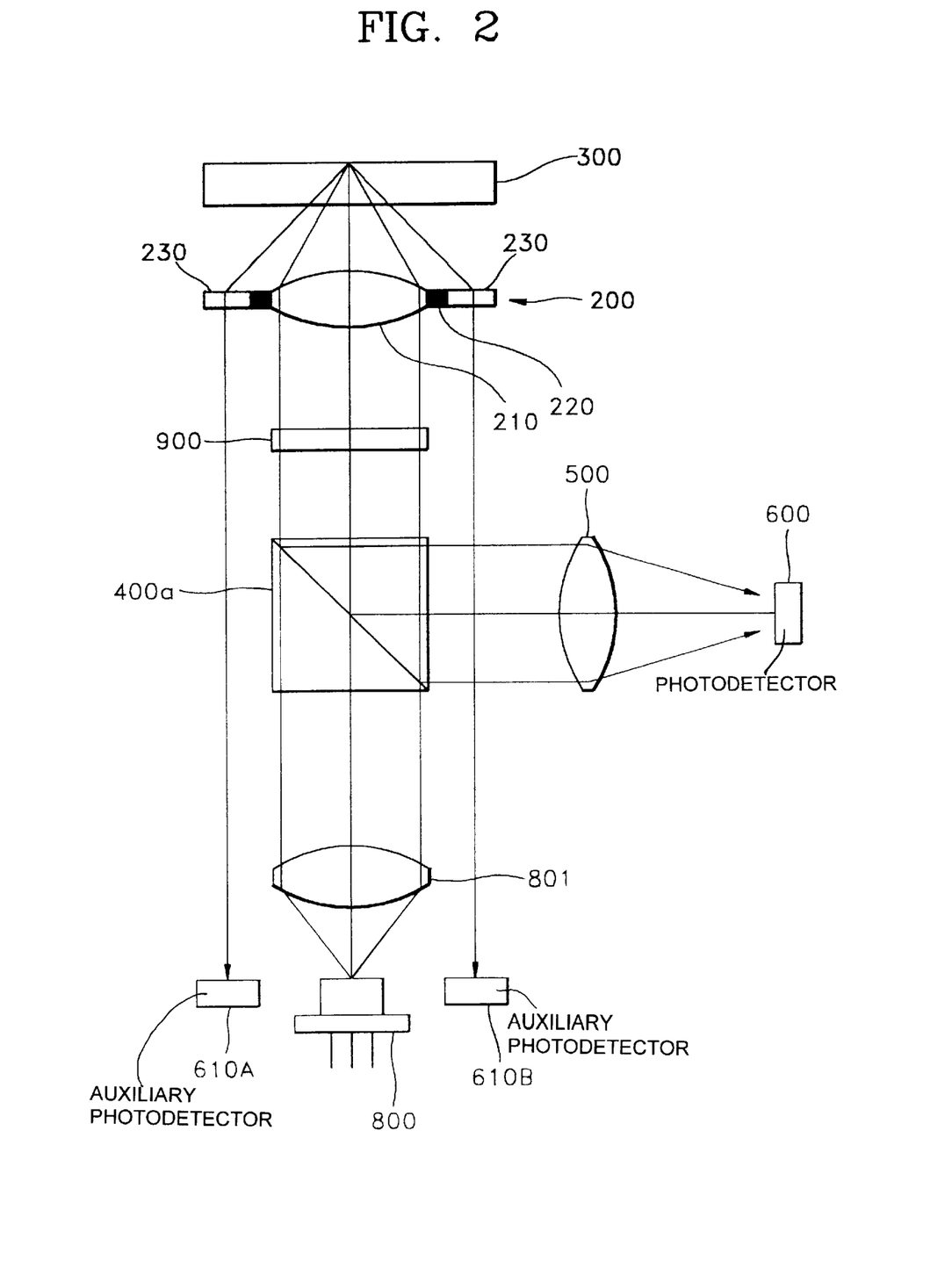
FIG. 2 is a schematic diagram of an optical pickup device according to a second embodiment of the present invention.

FIG. 2 is a schematic diagram of an optical pickup device according to a second embodiment of the present invention.

Figure 3:
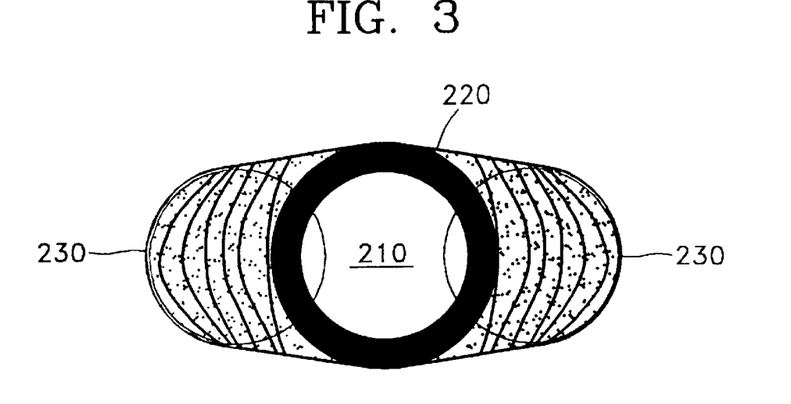
FIG. 3 is a schematic front view of an objective lens adopted for the optical pickup device according to the second embodiment of the present invention.

In this embodiment, in contrast with the first embodiment, a light source 800 and an objective lens unit 200 are positioned in a linear light traveling path. As shown in FIG. 3, an objective lens unit 200 has an objective lens 210, light controlling means 220 surrounding the objective lens 210, and auxiliary lenses 230 (hologram lenses) disposed around the light controlling means 220. Auxiliary detecting means, the auxiliary photodetectors 610A and 610B, for detecting the light emitted from the auxiliary lenses 230, is positioned in exterior sides of the light source 800. A wavelength plate 900 and a polarizing splitter 400a are positioned between the light source 800 and the objective lens unit 200. The photodetector 600 is positioned in the path diffracted by the polarizing splitter 400a. A detecting lens 500 is interposed between the polarizing splitter 400a and the photodetector 600. A collimating lens 801 for focusing the light emitted from the light source 800 is positioned between the polarizing splitter 400a and the light source 800.

In each of the above two embodiments, the light emitted from the light source 800 and the zero-order diffracted light reflected from the disc 300 pass through the objective lens 210, and the ±1st-order diffracted light reflected from the disc 300 pass through the auxiliary lenses 230. At this time, the ±1st-order diffracted light partially passes through the edge portion of the objective lens 210. Therefore, the zero-order diffracted light reflected from the disc 300 and having passed through the objective lens 210 reaches the photodetector 600 via the beam splitter 400a. The ±1st-order diffracted light having passed through the auxiliary lenses 230 reaches the auxiliary photodetectors 610A and 610B.

The zero-order diffracted light detected from the photodetector 600 and the ±1st-order diffracted light detected from the auxiliary photodetectors 610A and 610B are summed in an adder (not shown) to then be used as a reproduction signal. A difference signal of the −1st-order diffracted light detected from one auxiliary photodetector 610A with respect to the +1st-order diffracted light detected from another auxiliary photodetector 610B is used as a track signal.

As described above, according to the optical pickup device of the present invention, a more stable control signal and reproduction signal can be obtained by the use of the ±1st-order diffracted light reflected from the disc 300, as compared to the conventional optical pickup device utilizing only the light passing through one objective lens as a signal source.

In the aforementioned optical pickup device according to the present invention, the auxiliary lenses and auxiliary photodetectors can be installed anywhere, without being limited by the above-described embodiments. Also, the objective lens, auxiliary lenses and light controlling means may be manufactured of any material which can accomplish the objects of the present invention.

The objective lens unit 200 includes second light controlling means for controlling, i.e., blocking, scattering or absorbing, the light of the intermediate region between the near axis and far axis, among the light beams passing through the objective lens 210, so that information can be written or read from two discs having different thicknesses.

As described above, the optical pickup device according to the present invention, which can be commonly used for two discs, is equipped with an objective lens unit (described later) and its overall structure is such that the objective lens unit and photodetector in the first and second embodiments are replaced with an objective lens unit and a photodetector to be described later, respectively.

Figure 4:
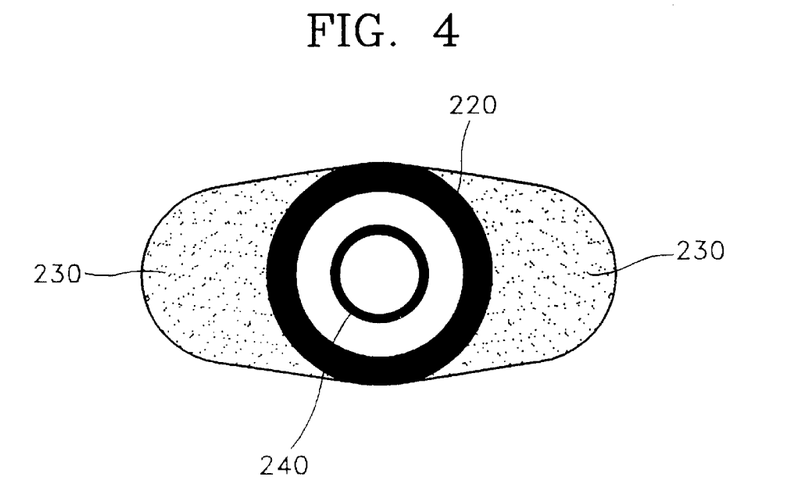
FIG. 4 is a schematic side view of an objective lens adopted for an optical pickup device according to a third embodiment of the present invention.

FIG. 4 schematically shows an objective lens unit adopted to an optical pickup device according to a third embodiment of the present invention.

In the objective lens unit, there is provided first light controlling means 220 surrounding an objective lens 210 having a predetermined numerical aperture, e.g., 0.6, and auxiliary lenses 230 disposed around the first light controlling means 220, which is the same as the structure of the objective lens unit 200 of the first embodiment. In addition, in this embodiment, there is provided second light controlling means 240 of an annular shape having a predetermined diameter in the light passing plane of the objective lens 210. The second light controlling means 240 controls, i.e., blocks, scatters or absorbs, the light of the intermediate region between the near- and far-axis regions among the light beams passing through the objective lens 210.

In this embodiment, the light around the central axis of the light path, i.e., in an intermediate region between near-axis and far-axis regions, is controlled, i.e., blocked or shielded to form a small light spot from which interference of the light in the intermediate region is suppressed. To this end, in the intermediate region between the near axis and the far axis along the incident light path, there is provided light controlling means of an annular or perimetrical polygon (e.g., square) shape for controlling, i.e., blocking or scattering, light. This utilizes the fact that the light of the far-axis region does not affect the central light but the light of the intermediate region does. Here, the near-axis region is the region around the central axis (optical axis) of the lens having a substantially negligible aberration, the far-axis region is the region farther from the optical axis, and the intermediate region is between the near- and far-axis regions.

Figure 5:
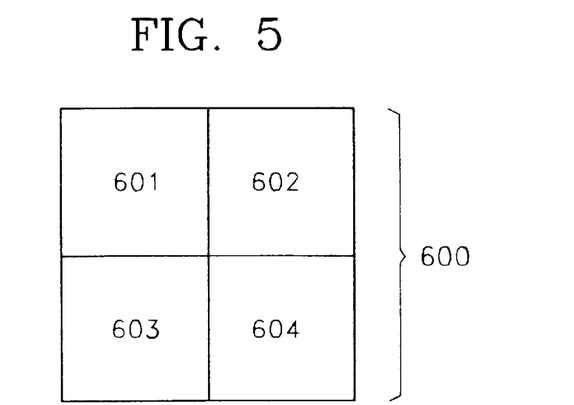
FIG. 5 is a plan view of a four-segment photodetector adopted for the optical pickup according to the present invention.

In the optical pickup device according to the third embodiment of the present invention, adopting the objective lens unit 200, there is provided a photodetector for selectively detecting the light passing through the second light controlling means 240 when information is read from a thick disc, e.g., a 1.2 mm CD, and for detecting the light passing through the objective lens 210 when information is read from a thin disc, e.g., a 0.6 mm DVD. As such a photodetector, a conventional four-segment photodetector may be adopted, as shown in FIG. 5. A spot formed in the center of a photodetector 600 having four detecting elements 601, 602, 603 and 604 is shown in FIGS. 6 and 7, depending on the disc thickness.

Figure 6:
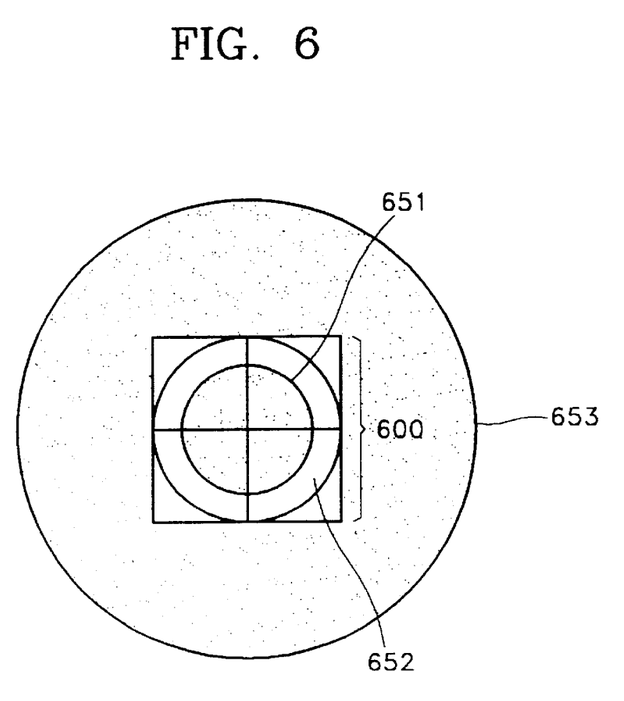
FIGS. 6 and 7 show spot shapes formed on the four-segment photodetector shown in FIG. 5, depending on disc type.

FIG. 6 shows the shape of a spot formed on the photodetector 600 when adopting a relatively thick disc, e.g., a 1.2 mm CD. FIG. 7 shows the shape of a spot formed on the photodetector 600 when adopting a relatively thin disc, e.g., a 0.6 mm DVD. The central portion 651 of the spot produced by the near-axis region light undergoes a small change in diameter, irrespective of the disc thickness. However, the diameters of the intermediate portion 652 and peripheral portion 653 are changed greatly.

In other words, as shown in FIG. 6, the central portion 651 of the spot is positioned in the center of the photodetector 600 and the peripheral portion 653 thereof surrounds the photodetector 600. The intermediate portion 652 between the central portion 651 and peripheral portion 653 is a light-eliminated portion by the second light controlling means 240. In other words, when information is reproduced from a thick disc, a 1.2 mm disc, the central portion 651 and peripheral portion 653 are greatly enlarged by spherical aberration, so that only the light of the near axis region, i.e., the central portion 651 of the spot, is used.

Figure 7:
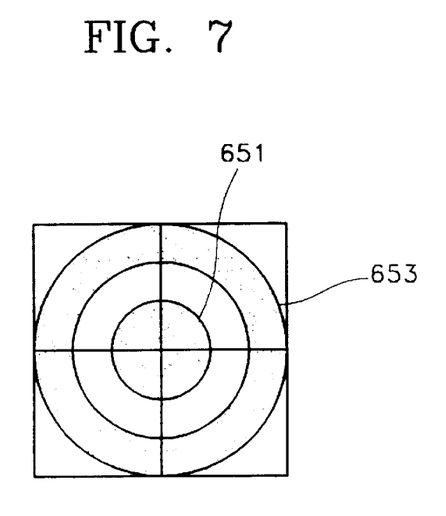

Also, as shown in FIG. 7, the central portion 651 and peripheral portion 653 are both formed on the detection plane of the photodetector 600. In other words, when information is reproduced from a thin (0.6 mm) disc, all of the light of both the near- and far-axis regions, excluding the light of the intermediate region which is removed by the light controlling member, are used. Here, the diameter of the central portion 651 is maintained to a similar level, irrespective of a disc type.

As described above, to read information from two discs having different thicknesses, the optical pickup device according to the present invention adopts the photodetector 800 devised so as to receive only the light of the near-axis region in reading information from a thick disc and receive the light of the near- and far-axis regions in reading information from a thin disc. Therefore, when a thick disc is used, a signal corresponding to the light of the near-axis region is obtained. When a thin disc is used, a relatively high signal corresponding to the light of the near- and far-axis regions is obtained.

Figure 8:
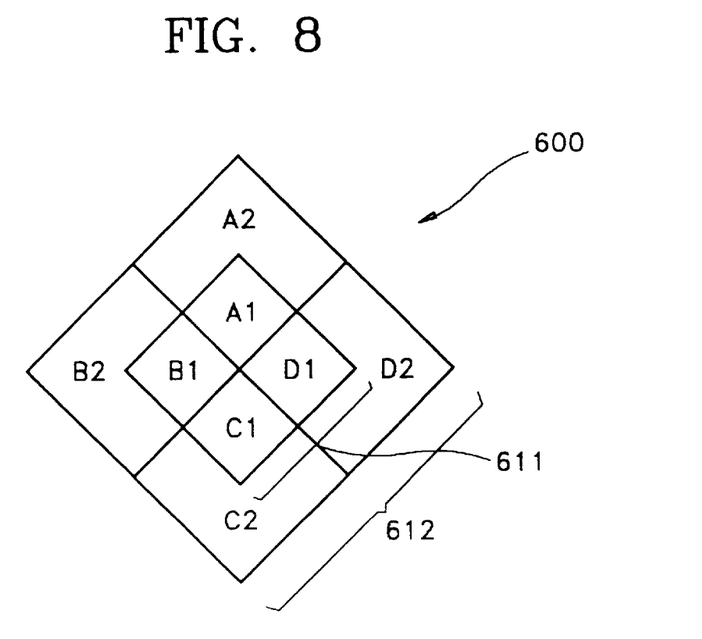
FIG. 8 is a plan view of an eight-segment photodetector adopted for the optical pickup according to the present invention.

The photodetector 600 may be of another type, as shown in FIG. 8. The photodetector 600 shown in FIG. 8 has a structure such that a second detection region is added around the photodetector of FIG. 5. In other words, the photodetector 600 in this embodiment includes the first detection region 611 which is located centrally and the second detection region 612 located around the first detection region 611. The first detection region 611 consists of four square first-light-receiving elements A1, B1, C1 and D1. The second detection region 612 consists of four L-shaped second-light-receiving elements A2, B2, C2 and D2 disposed so as to surround the first-light-receiving elements A1, B1, C1 and D1 of the first detection region 611.

Figure 9:
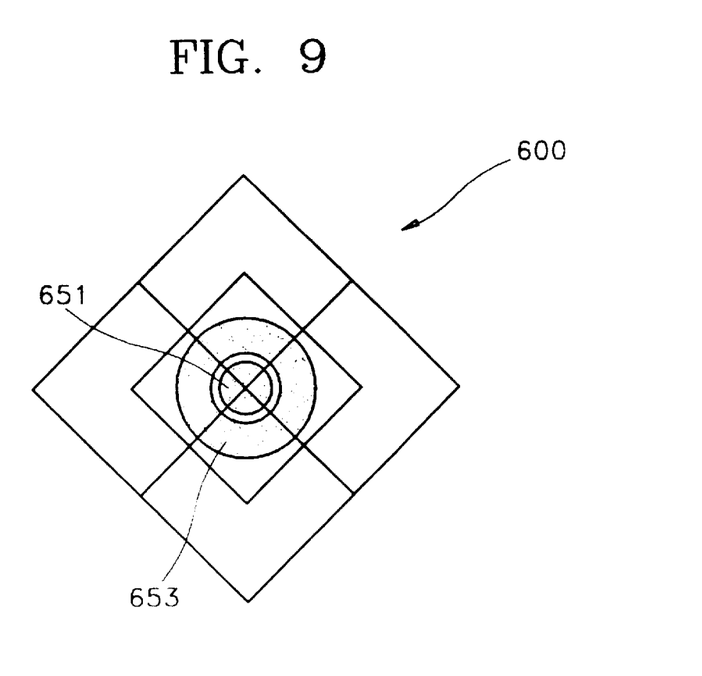
FIGS. 9 to 11 show spot shapes formed on the eight-segment photodetector shown in FIG. 8, depending on the distance between an objective lens and a thin disc.
Figure 10:
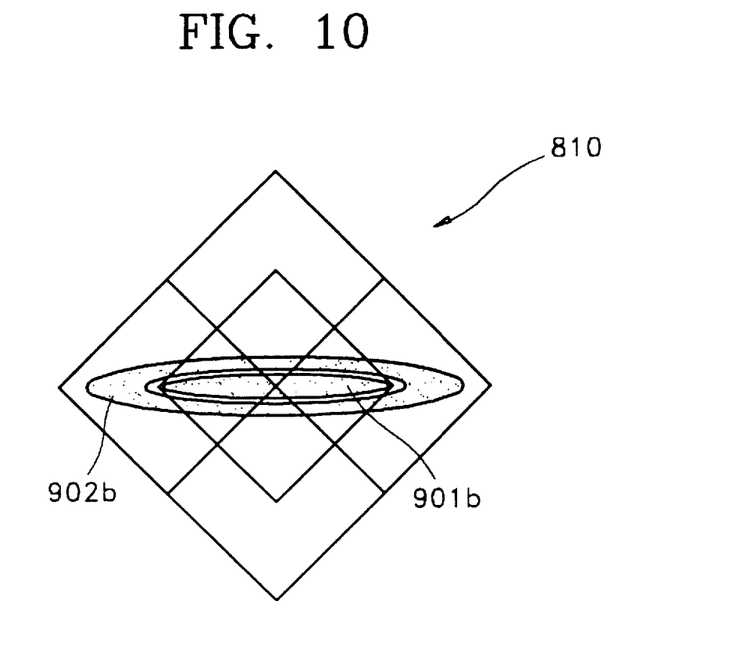
Figure 11:
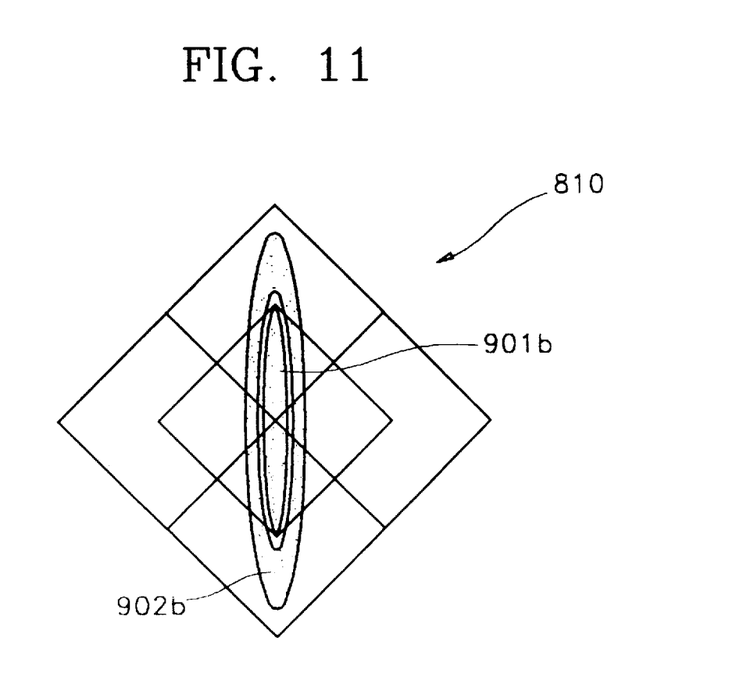
Figure 12:
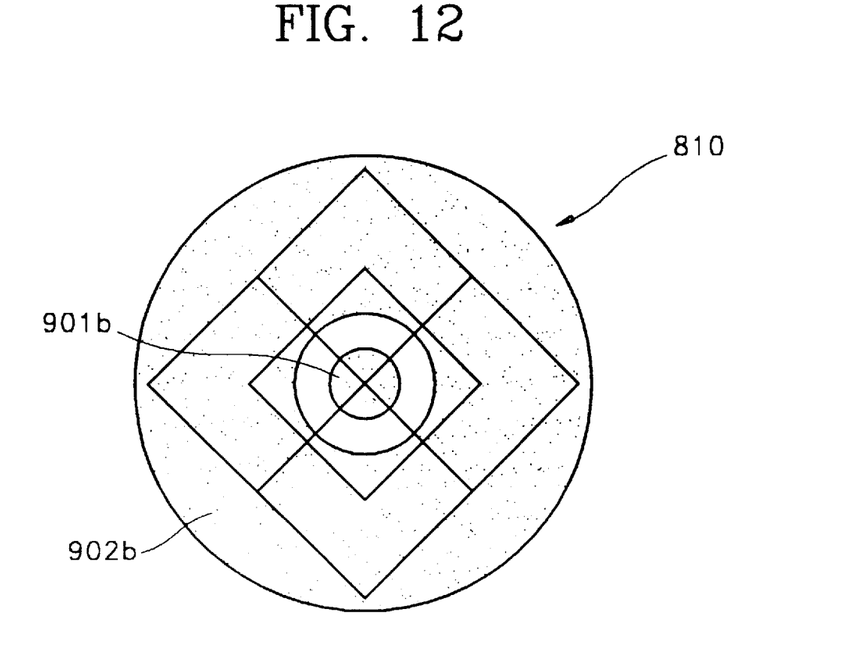
FIGS. 12 to 14 show spot shapes formed on the eight-segment photodetector shown in FIG. 8, depending on the distance between an objective lens and a thick disc.
Figure 13:
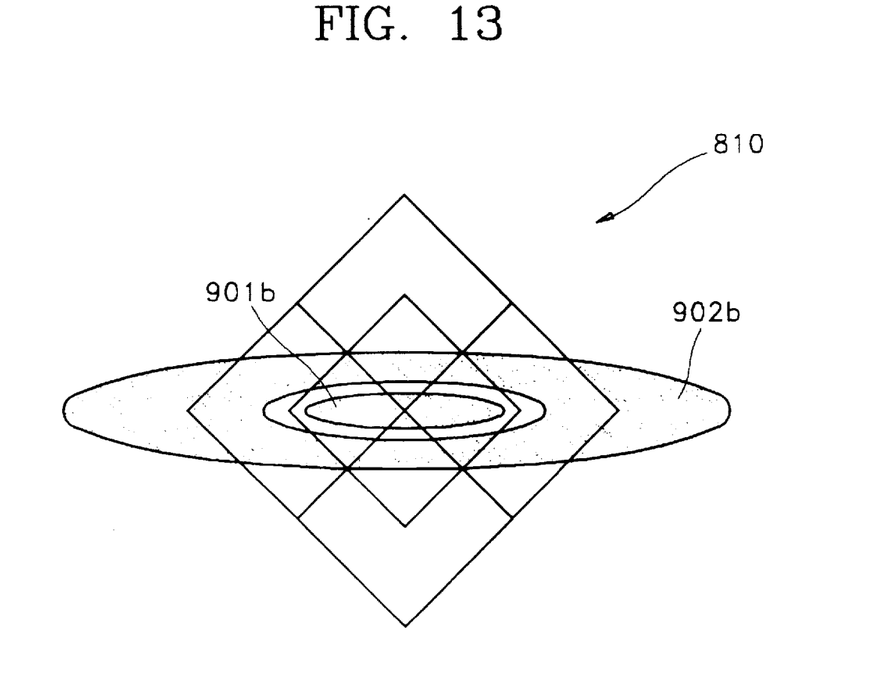
Figure 14:
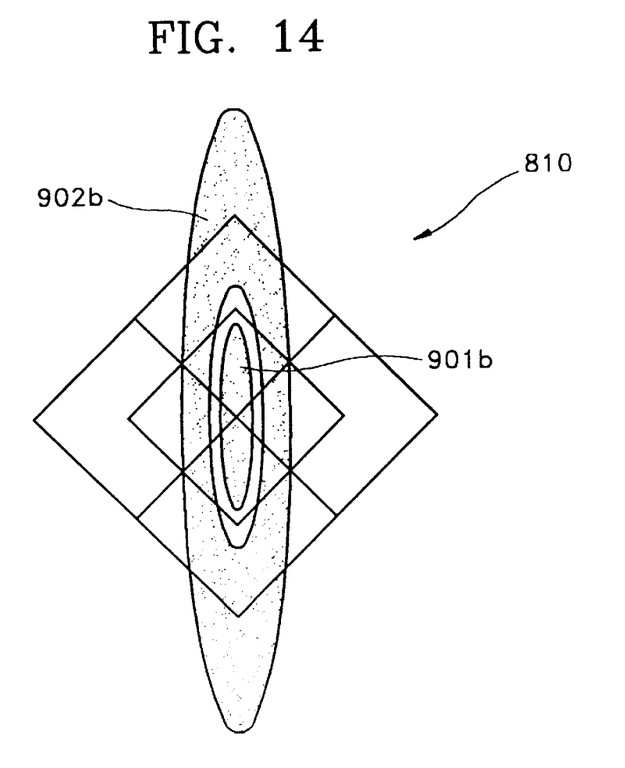

FIGS. 9 through 11 show the light-receiving states of the photodetector 600 when a thin disc (DVD) is used. FIGS. 12 through 14 show the light-receiving states of the photodetector when a thick disc (CD) is used.

In the photodetector 600 having the aforementioned structure, the entire signal, i.e., that from both the first and second detection regions, is used in reading information from a thin disc, and only the signal from the first detection region is used in reading information from a thick disc.

Figure 15:
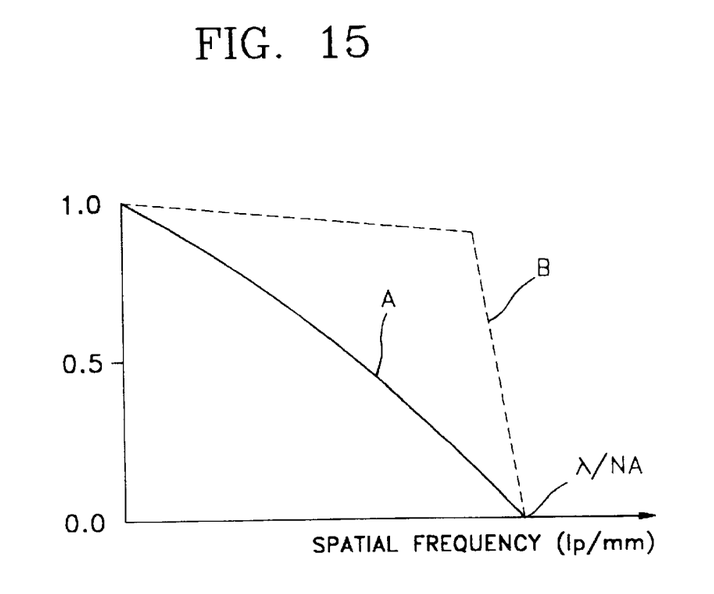
FIG. 15 is a graph illustrating the light modulation function for the optical pickup device according to the present invention.

As described above, according to the optical pickup device of the present invention, a zero-order diffracted light signal detected from the photodetector 600 and a ±1st-order diffracted light signal detected from the auxiliary photodetector 610A and 610B are summed in an adder (not shown) to be used as a reproduction signal. Also, a difference signal of a −1st-order diffracted light signal detected from the auxiliary photodetector 610B with respect to a +1st-order diffracted light signal detected from the auxiliary photodetector 610A is used as a track signal. Therefore, a high reproduction signal and a stable track signal can be obtained. As the result, as shown in FIG. 15, a light modulating function value (B) of the optical pickup device according to the present invention indicative of the reproduction signal is considerably increased, compared to that (A) of a conventional optical pickup device. Also, since there is provided second light controlling means for controlling the light between the near and far axes regions of an objective lens, a 1.2 mm CD and a 0.6 mm DVD can be commonly used without any configuration change.

What is claimed is:

1. An optical pickup device comprising:

an objective lens unit having an objective lens facing a disc and having a predetermined effective diameter and at least two auxiliary lenses provided at exterior sides of said objective lens for directing 1st-order diffracted light of reflected incident light from the disc to a first light path different from a second light path of the incident light passing through said objective lens;

a light source for irradiating the incident light onto the disc through said objective lens;

a light splitter interposed between said light source and said objective lens for directing zero-order light of the incident light reflected from the disc to a third light path different from the second light path of the incident light from said light source;

a photodetector for detecting the zero-order light reflected from the disc and traveling via said light splitter; and at least two diffracted light detectors for detecting the 1st-order diffracted light incident from said auxiliary lenses, respectively.

2. An optical pickup device as claimed in claim 1, wherein the disc, said light source and said objective lens are positioned in a linear light travelling path and said photodetector is positioned in the path diffracted by said light splitter.

3. An optical pickup device as claimed in claim 1, wherein the disc, said objective lens and said photodetector are positioned in a linear light path and said light source is positioned in the path diffracted by said light splitter.

4. An optical pickup device as claimed in claim 1, wherein said auxiliary lenses are hologram lenses based on a diffraction theory.

5. An optical pickup device as claimed in claim 2, wherein said auxiliary lenses are hologram lenses based on a diffraction theory.

6. An optical pickup device as claimed in claim 3, wherein said auxiliary lenses are hologram lenses based on a diffraction theory.

7. An optical pickup device as claimed in claim 1, wherein said objective lens and auxiliary lenses are integrally formed.

8. An optical pickup device as claimed in claim 2, wherein said objective lens and auxiliary lenses are integrally formed.

9. An optical pickup device as claimed in claim 3, wherein said objective lens and auxiliary lenses are integrally formed.

10. An optical pickup device as claimed in claim 1, further comprising first light controlling means formed between said objective lens and auxiliary lenses.

11. An optical pickup device as claimed in claim 2, further comprising first light controlling means formed between said objective lens and auxiliary lenses.

12. An optical pickup device as claimed in claim 3, further comprising first light controlling means formed between said objective lens and auxiliary lenses.

13. An optical pickup device as claimed in claim 4, further comprising first light controlling means formed between said objective lens and auxiliary lenses.

14. An optical pickup device as claimed in claim 5, further comprising first light controlling means formed between said objective lens and auxiliary lenses.

15. An optical pickup device as claimed in claim 6, further comprising first light controlling means formed between said objective lens and auxiliary lenses.

16. An optical pickup device as claimed in claim 7, further comprising first light controlling means formed between said objective lens and auxiliary lenses.

17. An optical pickup device as claimed in claim 8, further comprising first light controlling means formed between said objective lens and auxiliary lenses.

18. An optical pickup device as claimed in claim 9, further comprising first light controlling means formed between said objective lens and auxiliary lenses.

19. An optical pickup device as claimed in claim 1, further comprising light controlling means for controlling light of an intermediate region between near- and far-axis regions of the incident light and formed around a central axis of said objective lens.

20. An optical pickup device as claimed in claim 2, further comprising light controlling means for controlling light of an intermediate region between near- and far-axis regions of the incident light and formed around a central axis of said objective lens.

21. An optical pickup device as claimed in claim 3, further comprising light controlling means for controlling light of an intermediate region between near- and far-axis regions of incident light and formed around a central axis of said objective lens.

22. An optical pickup device as claimed in claim 4, further comprising wherein light controlling means for controlling light of an intermediate region between near- and far-axis regions of an incident light and formed around a central axis of said objective lens.

23. An optical pickup device as claimed in claim 5, further comprising light controlling means for controlling light of an intermediate region between near- and far-axis regions of incident light and formed around a central axis of said objective lens.

24. An optical pickup device as claimed in claim 6, further comprising light controlling means for controlling light of an intermediate region between near- and far-axis regions of incident light and formed around a central axis of said objective lens.

25. An optical pickup device as claimed in claim 7, further comprising light controlling means for controlling light of an intermediate region between near- and far-axis regions of incident light and formed around a central axis of said objective lens.

26. An optical pickup device as claimed in claim 8, further comprising light controlling means for controlling light of an intermediate region between near- and far-axis regions of incident light and formed around a central axis of said objective lens.

27. An optical pickup device as claimed in claim 9, further comprising light controlling means for controlling light of an intermediate region between near- and far-axis regions of incident light and formed around a central axis of said objective lens.

28. An optical pickup device as claimed in claim 10, further comprising second light controlling means for controlling light of an intermediate region between near- and far-axis regions of incident light and formed around a central axis of said objective lens.

29. An optical pickup device as claimed in claim 11, further comprising second light controlling means for controlling light of an intermediate region between near- and far-axis regions of incident light and formed around a central axis of said objective lens.

30. An optical pickup device as claimed in claim 12, further comprising second light controlling means for controlling light of an intermediate region between near- and far-axis regions of an incident light and formed around a central axis of said objective lens.

31. An optical pickup device as claimed in claim 13, further comprising second light controlling means for controlling light of an intermediate region between near- and far-axis regions of incident light and formed around a central axis of said objective lens.

32. An optical pickup device as claimed in claim 14, further comprising second light controlling means for controlling light of an intermediate region between near- and far-axis regions of incident light and formed around a central axis of said objective lens.

33. An optical pickup device as claimed in claim 15, further comprising second light controlling means for controlling light of an intermediate region between near- and far-axis regions of incident light and formed around a central axis of said objective lens.

34. An optical pickup device as claimed in claim 16, further comprising second light controlling means for controlling light of an intermediate region between near- and far-axis regions of incident light and formed around a central axis of said objective lens.

35. An optical pickup device as claimed in claim 17, further comprising second light controlling means for controlling light of an intermediate region between near- and far-axis regions of incident light and formed around a central axis of said objective lens.

36. An optical pickup device as claimed in claim 18, further comprising second light controlling means for controlling light of an intermediate region between near- and far-axis regions of incident light and formed around a central axis of said objective lens.

37. An optical pickup device for radiating incident light onto an optical recording medium, comprising:
  a light source for producing incident light;
  an objective lens unit having
    an objective lens to direct the incident light onto the optical recording medium and zero-order diffracted light from the optical recording medium, and
    an auxiliary lens unit, formed exterior to said objective lens, to direct 1st-order diffracted light from the optical recording medium to a first light path different from a second light path of the incident light passing said objective lens;
  a light splitter interposed in the second light path between said light source and said objective lens, to direct the zero-order diffracted light passed through said objective lens to a third optical path different from the second optical path of the incident light;

a first light detector to detect the zero-order diffracted light passed through said light splitter; and first and second diffracted light detectors, spaced apart from each other, to detect respective portions of the 1st-order diffracted light passed through said auxiliary lens unit.

38. The optical pickup device as claimed in claim 37, wherein said auxiliary lens unit comprises first and second auxiliary lens portions disposed at opposite exterior sides of said objective lens, to direct the respective portions of the 1st order diffracted light to said first and second diffracted light detectors, respectively.

39. The optical pickup device as claimed in claim 38, wherein the optical pickup device sums the zero-order diffracted light received by said first light detector and the respective portions of the 1st-order diffracted light received by the respective first and second diffracted light detectors, to be used as a reproduction signal.

40. The optical pickup device as claimed in claim 38, wherein the optical pickup device determines a difference between the respective portions of the 1st-order diffracted light received by the respective first and second diffracted light detectors, wherein the difference is used as a track signal.

41. The optical pickup device as claimed in claim 38, further comprising a first light controlling unit formed between said objective lens and said first and second auxiliary lens portions.

42. The optical pickup device as claimed in claim 41, further comprising a second light controlling unit, formed in an intermediate region of said objective lens, between near- and far-axis regions centered about an optical axis of said objective lens, to limit an amount of light passing through the intermediate region of said objective lens.

43. The optical pickup device as claimed in claim 42, wherein:

the optical recording medium is a disc; and said first light detector detects only the zero-order diffracted light passing through the near-axis region of said objective lens if the disc has a first thickness and detects the zero-order diffracted light from both the near- and far-axis regions of said objective lens if the disc has a second thickness less than the first thickness.

44. The optical pickup device as claimed in claim 43, wherein said first light detector is rectangular and has four detecting elements which bisect a width and a height of said first light detector.

45. The optical pickup device as claimed in claim 43, wherein if the disc has the first thickness the disc is a compact disc, and if the disc has a second thickness, the disc is a digital video disc.

46. The optical pickup device as claimed in claim 42, wherein:

the optical recording medium is a disc; and said first light detector has a first detecting region formed at a central portion thereof and a second detecting region surrounding the first detecting region;

wherein said first light detector uses only the zero-order diffracted light received by the first detecting region if the disc has a first thickness and uses the zero-order diffracted light received from both the first and second detecting regions if the disc has a second thickness less than the first thickness.

47. The optical pickup device as claimed in claim 46, wherein:

the first detecting region includes four first detecting elements which bisect a width and a height of said first light detector; and the second detecting region includes four L-shaped second detecting elements which surround the four first detecting elements.

48. The optical pickup device as claimed in claim 43, wherein if the disc has the first thickness the disc is a compact disc, and if the disc has a second thickness, the disc is a digital video disc.

49. The optical pickup device as claimed in claim 1, wherein the optical pickup device sums the zero-order diffracted light received by said photodetector and the respective portions of the 1st-order diffracted light received by first and second ones of the at least two diffracted light detectors, to be used as a reproduction signal.

50. The optical pickup device as claimed in claim 1, wherein the optical pickup device determines a difference between the respective portions of the 1st-order diffracted light received by first and second ones of the at least two diffracted light detectors, wherein the difference is used as a track signal.

51. An optical pickup device as claimed in claim 2, further comprising:

a collimating lens formed between said light source and said light splitter, to collimate the incident light prior to transmission to the light splitter; and a wavelength plate formed between said light splitter and said objective lens;

wherein said light source, collimating lens, light splitter, wavelength plate, objective lens, and the disc are in the linear light travelling path in order.

52. An optical pickup device as claimed in claim 3, further comprising a detecting lens formed between said photodetector and said light splitter, wherein said photodetector, detecting lens, light splitter, objective lens, and the disc are in the linear light travelling path in order.

* * * * *